US010789085B2

(12) United States Patent
Jang

(10) Patent No.: US 10,789,085 B2
(45) Date of Patent: Sep. 29, 2020

(54) SELECTIVELY PROVIDING VIRTUAL MACHINE THROUGH ACTUAL MEASUREMENT OF EFFICIENCY OF POWER USAGE

(71) Applicant: ELECTRONICS AND TELECOMMUNICATIONS RESEARCH INSTITUTE, Daejeon (KR)

(72) Inventor: Su-Min Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 263 days.

(21) Appl. No.: 15/678,763

(22) Filed: Aug. 16, 2017

(65) Prior Publication Data

US 2018/0267820 A1   Sep. 20, 2018

(30) Foreign Application Priority Data

Mar. 16, 2017   (KR) ........................ 10-2017-0033134

(51) Int. Cl.
*G06F 9/455* (2018.01)
*G06F 9/50* (2006.01)
(Continued)

(52) U.S. Cl.
CPC .......... *G06F 9/45558* (2013.01); *G06F 1/266* (2013.01); *G06F 1/3209* (2013.01);
(Continued)

(58) Field of Classification Search
CPC .. G06F 9/45558; G06F 1/3234; G06F 9/5094; G06F 9/5027; G06F 2009/45575; G06F 2009/45579; G06F 2009/4557
See application file for complete search history.

(56) References Cited

U.S. PATENT DOCUMENTS 9,575,808 B1 * 2/2017 Yamala ............... G06F 9/45558
2009/0187775 A1 * 7/2009 Ishikawa ............... G06F 1/3287
713/310

(Continued)

FOREIGN PATENT DOCUMENTS

KR   10-2007-0008668 A   1/2007
KR   10-2011-0040657 A   4/2011
(Continued)

*Primary Examiner* — Benjamin C Wu

(57) ABSTRACT

Disclosed are a method, apparatus, and system for selectively providing a virtual machine through actual measurement of efficiency of power usage. When a user terminal requests to provide a virtual machine, candidate virtual machines are activated on multiple virtual machine servers. Input data provided by the user terminal are provided to each of the multiple candidate virtual machines through replication and network virtualization, and identical candidate virtual machines are run on the multiple virtual machine servers through replication and network virtualization. When the candidate virtual machines are run, one of the candidate virtual machines is finally selected as the virtual machine to be provided to the user terminal based on efficiency of power usage.

20 Claims, 12 Drawing Sheets

(51) Int. Cl.
  *G06F 1/26* (2006.01)
  *G06F 1/3209* (2019.01)
  *G06F 1/3234* (2019.01)

(52) U.S. Cl.
  CPC .......... *G06F 1/3234* (2013.01); *G06F 9/5027* (2013.01); *G06F 9/5094* (2013.01); *G06F 2009/45575* (2013.01); *G06F 2009/45579* (2013.01); *G06F 2009/45591* (2013.01); *Y02D 10/22* (2018.01); *Y02D 10/26* (2018.01); *Y02D 10/36* (2018.01)

(56) References Cited

U.S. PATENT DOCUMENTS

| | | | |
|---|---|---|---|
| 2010/0218183 A1* | 8/2010 | Wang | G06F 1/3228 718/1 |
| 2011/0084969 A1 | 4/2011 | Park et al. | |
| 2012/0005683 A1* | 1/2012 | Bower, III | G06F 9/5094 718/103 |
| 2013/0042229 A1* | 2/2013 | Jang | G06F 8/65 717/171 |
| 2014/0006534 A1* | 1/2014 | Jain | G06F 9/5094 709/208 |
| 2014/0214922 A1 | 7/2014 | Kim et al. | |
| 2015/0006940 A1* | 1/2015 | Kim | G06F 1/26 713/340 |
| 2015/0026306 A1 | 1/2015 | Moon et al. | |
| 2015/0082306 A1 | 3/2015 | Shin et al. | |

FOREIGN PATENT DOCUMENTS

| | | |
|---|---|---|
| KR | 10-2012-0000870 A | 1/2012 |
| KR | 10-2015-0009662 A | 1/2015 |
| KR | 10-2015-0086018 A | 7/2015 |
| WO | WO 2005/109195 A2 | 11/2005 |

* cited by examiner

SELECTIVELY PROVIDING VIRTUAL MACHINE THROUGH ACTUAL MEASUREMENT OF EFFICIENCY OF POWER USAGE

CROSS REFERENCE TO RELATED APPLICATION

This application claims the benefit of Korean Patent Application No. 10-2017-0033134, filed Mar. 16, 2017, which is hereby incorporated by reference in its entirety into this application.

BACKGROUND OF THE INVENTION

1. Technical Field

The following embodiments relate generally to a method, apparatus and system for improving energy efficiency when providing a virtual machine, and more particularly to a method, apparatus and system for selectively providing a virtual machine through actual measurement of efficiency of power usage.

2. Description of the Related Art

Virtualization technology is technology for running multiple Operating Systems (OSs) on a single computer. With the spread of the Internet and the development of virtualization technology, users may arrange their personal computers in the form of Virtual Machine (VM) in a server and connect their clients to the virtual machines running on the server, whereby the users may use desired functions that are provided in the virtual machines.

However, existing systems for providing virtual machines do not consider the amount of power consumed by the virtual machines. That is, the existing systems are configured to randomly select a server from which a virtual machine, requested by a user, is to be provided and to provide the virtual machine through the randomly selected server, or are configured to provide a required virtual machine based on a predefined energy policy.

However, various reasons often cause the applied energy policy to have limited effects or adverse effects.

In other words, a server or system based on existing virtualization technology is disadvantageous in that it unilaterally provides users with a virtual machine that is selected without consideration of energy savings. Also, such a server or system based on existing virtualization technology activates a virtual machine through a selection or policy that is inefficient from the aspect of use thereof.

With regard to efficiency of power usage by a virtual machine, Korean Patent Application Publication No. 2015-0009662 has been disclosed.

SUMMARY OF THE INVENTION

An embodiment may provide an apparatus and method in which efficiency of power usage by virtual machines is actually measured, whereby the virtual machine that is most suitable from the aspect of energy efficiency may be selected and provided.

An embodiment may provide an apparatus and method in which, through data replication and virtualization, identical candidate virtual machines are simultaneously run on multiple virtual machine servers, which enables the efficiency of power usage by the candidate virtual machines on the multiple virtual machine servers to be actually measured.

An embodiment may provide an apparatus and method in which multiple virtual machine servers may selectively provide a virtual machine depending on the efficiency of power usage by the virtual machine.

An embodiment may provide an apparatus and method for providing the most suitable virtual machine by actually measuring efficiency of power usage by a virtual machine according to various dynamic energy-saving policies in response to a service requested by a user.

An embodiment may provide an apparatus and method that enable energy savings by selecting and providing a virtual machine that is most suitable from the aspect of energy efficiency.

An embodiment may provide an apparatus and method for providing the most suitable virtual machine through efficiency of power usage and performance comparisons.

In one aspect, there is provided a method for providing a virtual machine, which includes activating multiple candidate virtual machines on multiple virtual machine servers by activating a candidate virtual machine on each of the multiple virtual machine servers in response to a request to provide a virtual machine from a user terminal; and selecting one of the multiple candidate virtual machines as the virtual machine to be provided to the user terminal based on efficiency of power usage by the multiple candidate virtual machines.

The multiple virtual machine servers may be some of all virtual machine servers, which are selected depending on predefined conditions.

Among the all virtual machine servers, a virtual machine server on which another candidate virtual machine, efficiency of power usage of which is to be measured, has been activated may be excluded from the multiple virtual machine servers when selecting the multiple virtual machine servers.

When the multiple candidate virtual machines are activated on the multiple virtual machine servers, the multiple virtual machine servers may have different states.

When the multiple candidate virtual machines are activated, the user terminal may simultaneously communicate with the multiple candidate virtual machines before the virtual machine is selected from among the multiple candidate virtual machines.

Input data provided to a candidate virtual machine by the user terminal may be provided to each of the multiple candidate virtual machines through replication and network virtualization.

The efficiency of power usage by the candidate virtual machine may be calculated by comparing efficiency of power usage actually measured before the candidate virtual machine is activated on the virtual machine server with efficiency of power usage actually measured after the candidate virtual machine is activated on the virtual machine server.

The efficiency of power usage actually measured after the candidate virtual machine is activated may be measured when a predefined time is elapsed after the candidate virtual machine is activated.

The virtual machine to be provided to the user terminal may be selected based on one or more variables related to power.

The one or more variables related to power may include at least one of the efficiency of power usage by each of the multiple candidate virtual machines, a temperature of a virtual machine server on which each of the multiple candidate virtual machines is run, a difference between a maximum value and a minimum value of the efficiency of power usage, a Central Processing Unit (CPU) utilization by the candidate virtual machine, a memory utilization by the candidate virtual machine, an I/O resources utilization by the candidate virtual machine, and an average network transfer rate of the candidate virtual machine.

A predefined number of or a predefined percentage of candidate virtual machines having least efficiency of power usage may be first selected from among the multiple candidate virtual machines.

One of the first selected candidate virtual machines may be selected as the virtual machine to be provided to the user terminal.

The virtual machine to be provided to the user terminal may be selected from among the multiple candidate virtual machines, using a skyline query for at least some of the one or more variables related to power.

When two or more candidate virtual machines are found as a result of the skyline query, one of the found candidate virtual machines may be selected as the virtual machine to be provided to the user terminal, using remaining variables, excluding the at least some of the one or more variables related to power.

In another aspect, there is provided a management server, which includes a communication unit for receiving a request to provide a virtual machine from a user terminal, sending a message for requesting activation of a virtual machine to each of multiple virtual machine servers, and receiving a response to the message from each of the multiple virtual machine servers; and a processing unit for establishing a policy for setting multiple candidate virtual machines.

The processing unit may select the multiple virtual machine servers that are capable of providing the virtual machine requested by the user terminal, among all virtual machine servers.

The communication unit may send the user terminal a message containing information about a list of virtual machines with which to communicate.

The message containing information about the list of virtual machines may include information about targets with which the user terminal is to concurrently communicate.

The communication unit may send a message for requesting virtual machine power information to the multiple virtual machine servers and receive the virtual machine power information from the multiple virtual machine servers.

The virtual machine power information may include information about efficiency of power usage by the multiple candidate virtual machines.

The processing unit may select one of the multiple candidate virtual machines as the virtual machine to be provided to the user terminal, based on the efficiency of power usage by the multiple candidate virtual machines.

The communication unit may send a message containing a result of selection of an optimal virtual machine to each of the multiple virtual machine servers.

The message containing the result of selection of the optimal virtual machine may indicate whether a candidate virtual machine on a virtual machine server that receives the message is selected as the virtual machine requested by the user terminal.

In a further aspect, there is provided a virtual machine server, which includes a communication unit for receiving a virtual machine activation request message, which is a request for activation of a candidate virtual machine, from a management server, sending a virtual machine activation server information message to the management server in response to the virtual machine activation request message, receiving a virtual machine power information request message, which is a request for information about efficiency of power usage by the candidate virtual machine, from the management server, and sending virtual machine power information related to the efficiency of power usage by the candidate virtual machine to the management server; and a processing unit for activating the candidate virtual machine and generating the virtual machine power information based on measurement of the efficiency of power usage.

The virtual machine power information may include the efficiency of power usage by the candidate virtual machine.

The efficiency of power usage may be calculated by comparing efficiency of power usage actually measured before the candidate virtual machine is activated on the virtual machine server with efficiency of power usage actually measured after the candidate virtual machine is activated on the virtual machine server.

The communication unit may receive a message containing a result of selection of an optimal virtual machine from the management server.

The message containing the result of selection of the optimal virtual machine may indicate whether the candidate virtual machine on the virtual machine server is selected as a virtual machine requested by a user terminal.

The processing unit may inactivate the candidate virtual machine when the message containing the result of selection of the optimal virtual machine says that the candidate virtual machine is not selected as the virtual machine.

Additionally, other methods, devices, and systems for implementing the present invention and a computer-readable recording medium for recording a computer program for implementing the above-described methods are further provided.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
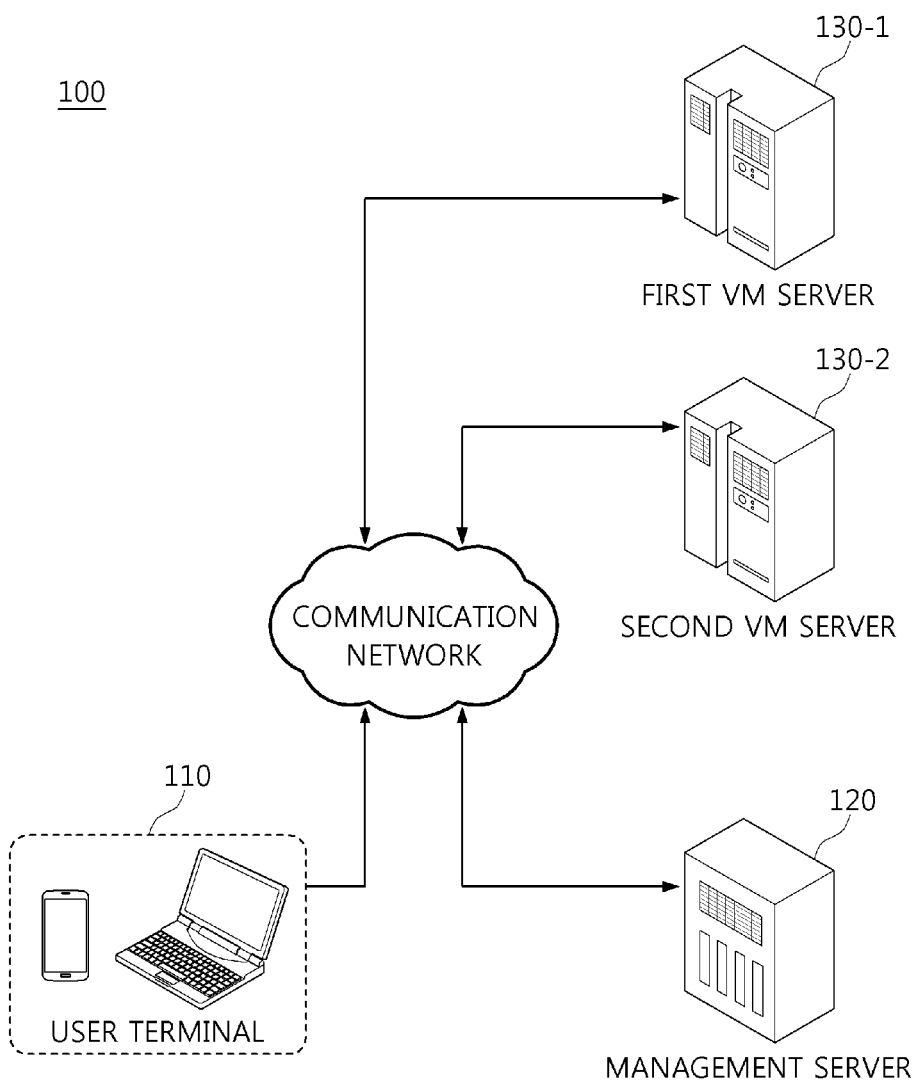
FIG. 1 is a concept diagram that shows a system for providing a virtual machine according to an embodiment.

Specific embodiments will be described in detail below with reference to the attached drawings. These embodiments are described in sufficient detail to enable those skilled in the art to practice the present invention. It should be understood that the embodiments differ from each other, but the embodiments do not need to be exclusive of each other. For example, a particular feature, structure, or characteristic described herein in connection with one embodiment may be implemented in another embodiment without departing from the spirit and scope of the present invention. Also, it should be understood that the location or arrangement of individual elements in the disclosed embodiments may be changed without departing from the spirit and scope of the present invention. Therefore, the following detailed description is not to be taken in a limiting sense, and if appropriately interpreted, the scope of the exemplary embodiments is limited only by the appended claims, along with the full range of equivalents to which the claims are entitled.

The same reference numerals are used to designate the same or similar elements throughout the drawings. The shapes, sizes, etc. of components in the drawings may be exaggerated to make the description clear.

The terms used herein are for the purpose of describing particular embodiments only and are not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Also, element modules described in the embodiments of the present invention are independently shown in order to indicate different characteristic functions, but this does not mean that each of the element modules is formed of a separate piece of hardware or software. That is, element modules are arranged and included for convenience of description, and at least two of the element units may form one element unit, or one element may be divided into multiple element units and the multiple element units may perform respective functions. An embodiment into which the elements are integrated or an embodiment from which some elements are removed is included in the scope of the present invention, as long as it does not depart from the essence of the present invention.

Also, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Hereinafter, embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

Hereinafter, the terms "efficiency of power usage" and "power consumption" may be used interchangeably with each other.

FIG. 1 is a concept diagram that shows a system for providing a virtual machine according to an embodiment.

The virtual machine provision system 100 may include a user terminal 110, a management server 120 and a virtual machine server 130.

The user terminal 110, the management server 120, and the virtual machine server 130 may be three main components of the virtual machine provision system 100. The main components may be connected with each other via a communication network and may send and receive messages required therebetween. The communication network in FIG. 1 may correspond to a network 299 in FIG. 2, a network 399 in FIG. 3, and a network 499 in FIG. 4, which will be described later.

The virtual machine server 130 may comprise multiple virtual machine servers. In FIG. 1, a first VM server 130-1 and a second VM server 130-2 are illustrated as representative of the multiple virtual machine servers.

The user terminal 110 may be Information Technology (IT) equipment including an interface that is ultimately used by a user. For example, the user terminal 110 may be a mobile phone, a smartphone, a personal computer, a tablet PC, or the like.

The virtual machine server 130 may directly control and run a virtual machine.

The multiple virtual machine servers may be multiple servers of the same or different types.

In the virtual machine provision system 100, the multiple virtual machine servers may generate respective virtual machines.

Figure 2:
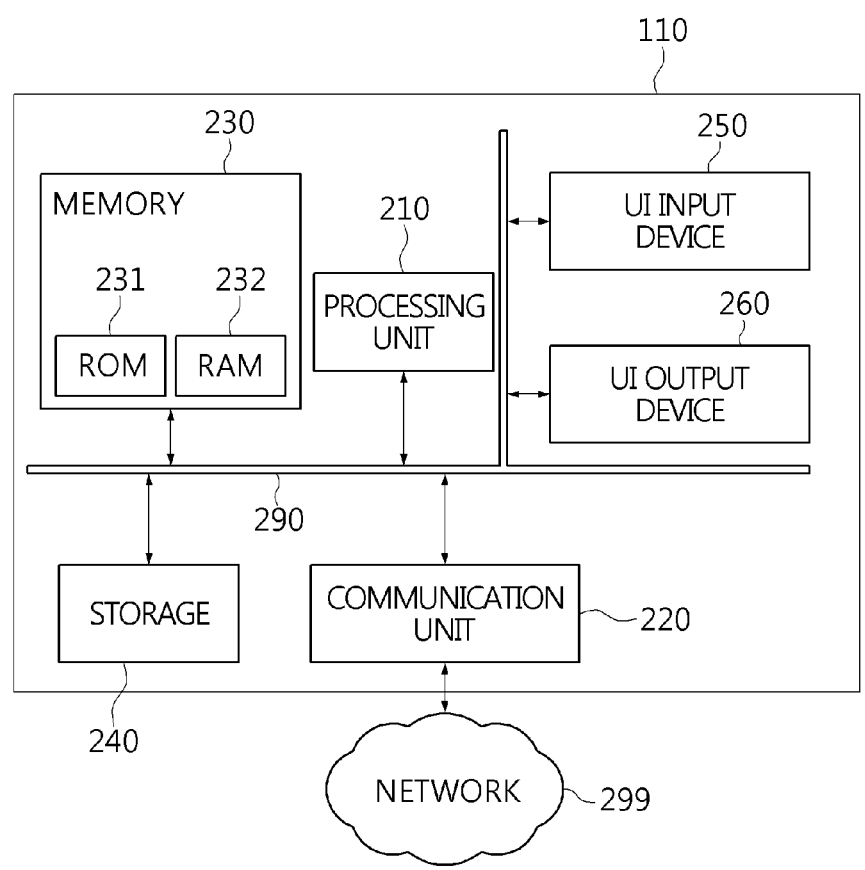
FIG. 2 is a block diagram of a user terminal according to an embodiment.

FIG. 2 is a block diagram of a user terminal according to an embodiment.

As illustrated in FIG. 2, the user terminal 110 may include at least some of a processing unit 210, a communication unit 220, memory 230, storage 240 and a bus 290. The components of the user terminal 110, such as the processing unit 210, the communication unit 220, the memory 230, the storage 240, and the like, may communicate with each other via the bus 290.

The processing unit 210 may be a semiconductor device for executing processing instructions stored in the memory 230 or the storage 240. For example, the processing unit 210 may be at least one hardware processor.

The processing unit 210 may process work required for the operation of the user terminal 110. The processing unit

210 may execute the code of operations or steps of the processing unit 210 explained in the embodiments.

The processing unit 210 may perform the generation, storage and output of information to be explained in the following embodiment, and may additionally process the operation of steps performed in the user terminal 110.

The communication unit 220 may be connected with a network 299, and may send and receive data or information required for the operation of the user terminal 110. The communication unit 220 may send data to other devices and receive data from other devices via the network 299. For example, the communication unit 220 may be a network chip or port.

The memory 230 and the storage 240 may be various types of volatile or nonvolatile storage media. For example, the memory 230 may include at least one of ROM 231 and RAM 232. The storage 240 may include an internal storage medium, such as RAM, flash memory, a hard disk, or the like, and may include a removable storage medium, such as a memory card or the like.

The function or operation of the user terminal 110 may be performed when the processing unit 210 executes at least one program module. The memory 230 and/or the storage 240 may store at least one program module therein. The at least one program module may be configured to be executed by the processing unit 210.

The user terminal 110 may further include a User Interface (UI) input device 250 and a UI output device 260. The UI input device 250 may receive user input required for the operation of the user terminal 110. The UI output device 260 may output information or data depending on the operation of the user terminal 110.

Figure 3:
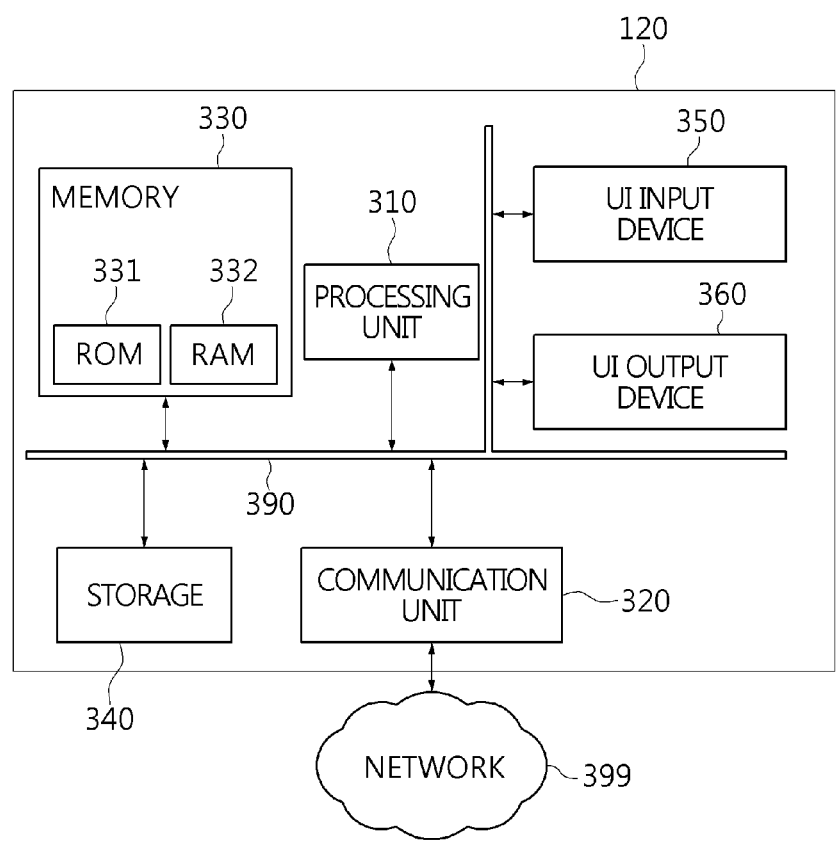
FIG. 3 is a block diagram of a management server according to an embodiment.

FIG. 3 is a block diagram of a management server according to an embodiment.

As illustrated in FIG. 3, the management server 120 may include at least some of a processing unit 310, a communication unit 320, memory 330, storage 340 and a bus 390. The components of the management server 120, such as the processing unit 310, the communication unit 320, the memory 330, the storage 340, and the like, may communicate with each other via the bus 390.

The processing unit 310 may be a semiconductor device for executing processing instructions stored in the memory 330 or the storage 340. For example, the processing unit 310 may be at least one hardware processor.

The processing unit 310 may process work required for the operation of the management server 120. The processing unit 310 may execute the code of operations or steps of the processing unit 310 explained in the embodiments.

The processing unit 310 may perform the generation, storage, and output of information to be explained in the following embodiment, and may additionally process the operation of steps performed in the management server 120.

The communication unit 320 may be connected with a network 399, and may send and receive data or information required for the operation of the management server 120. The communication unit 320 may send data to other devices and receive data from other devices via the network 399. For example, the communication unit 320 may be a network chip or port.

The memory 330 and the storage 340 may be various types of volatile or nonvolatile storage media. For example, the memory 330 may include at least one of ROM 331 and RAM 332. The storage 340 may include an internal storage medium, such as RAM, flash memory, a hard disk, or the like, and may include a removable storage medium, such as a memory card or the like.

The function or operation of the management server 120 may be performed when the processing unit 310 executes at least one program module. The memory 330 and/or the storage 340 may store at least one program module therein. The at least one program module may be configured to be executed by the processing unit 310.

The management server 120 may further include a User Interface (UI) input device 350 and a UI output device 360. The UI input device 350 may receive user input required for the operation of the management server 120. The UI output device 360 may output information or data depending on the operation of the management server 120.

Figure 4:
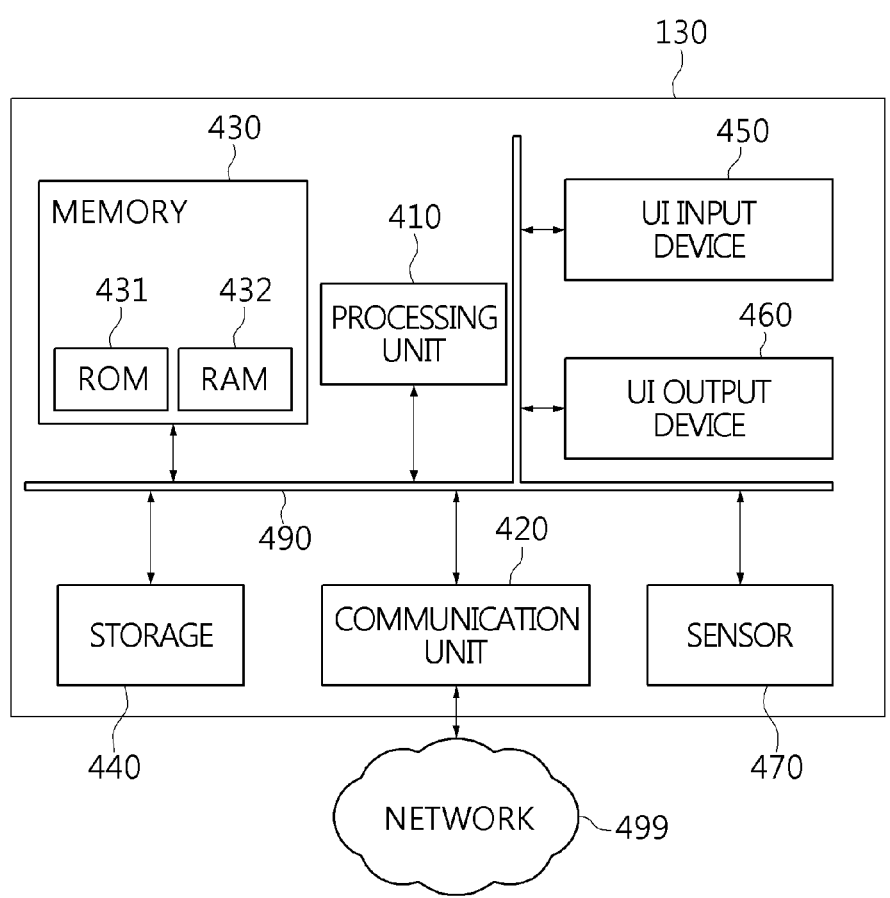
FIG. 4 is a block diagram of a virtual machine server according to an embodiment.

FIG. 4 is a block diagram of a virtual machine server according to an embodiment.

As illustrated in FIG. 4, the virtual machine server 130 may include at least some of a processing unit 410, a communication unit 420, memory 430, storage 440 and a bus 490. The components of the virtual machine server 130, such as the processing unit 410, the communication unit 420, the memory 430, the storage 440, and the like, may communicate with each other via the bus 490.

The processing unit 410 may be a semiconductor device for executing processing instructions stored in the memory 430 or the storage 440. For example, the processing unit 410 may be at least one hardware processor.

The processing unit 410 may process work required for the operation of the virtual machine server 130. The processing unit 410 may execute the code of operations or steps of the processing unit 410 explained in the embodiments.

The processing unit 410 may perform the generation, storage, and output of information to be explained in the following embodiment, and may additionally process the operation of steps performed in the virtual machine server 130.

The communication unit 420 may be connected with a network 499, and may receive and send data or information required for the operation of the virtual machine server 130. The communication unit 420 may send data to other devices and receive data from other devices via the network 499. For example, the communication unit 420 may be a network chip or port.

The memory 430 and the storage 440 may be various types of volatile or nonvolatile storage media. For example, the memory 430 may include at least one of ROM 431 and RAM 432. The storage 440 may include an internal storage medium, such as RAM, flash memory, a hard disk, or the like, and may include a removable storage medium, such as a memory card or the like.

The function or operation of the virtual machine server 130 may be performed when the processing unit 410 executes at least one program module. The memory 430 and/or the storage 440 may store at least one program module therein. The at least one program module may be configured to be executed by the processing unit 410.

The virtual machine server 130 may further include a User Interface (UI) input device 450 and a UI output device 460. The UI input device 450 may receive user input required for the operation of the virtual machine server 130. The UI output device 460 may output information or data depending on the operation of the virtual machine server 130.

The virtual machine server 130 may further include a sensor 470.

Figure 5:
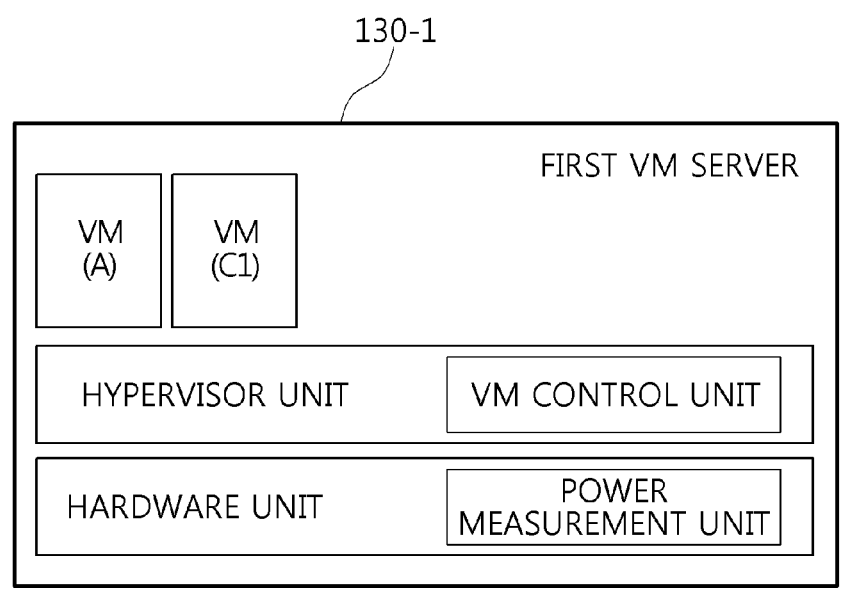
FIG. 5 shows the configuration of a first virtual machine server according to an example.

FIG. 5 shows the configuration of a first virtual machine server according to an example.

The virtual machine server 130 may include a hardware unit. The hardware unit may correspond to the processing unit 410, the communication unit 420, the memory 430, the storage 440, the sensor 470 and the bus 490, which have been described with reference to FIG. 4.

The hardware unit may include a power measurement unit. The power measurement unit may correspond to the sensor 470. That is, the sensor 470 may measure power.

The power measurement unit may measure efficiency of power usage of the virtual machine server 130.

The virtual machine server 130 may include a hypervisor unit. The hypervisor unit may be a hypervisor running on the virtual machine server 130.

The hypervisor unit may include a VM control unit. The VM control unit may control a virtual machine running on the virtual machine server 130. For example, the VM control unit may perform the generation, setting or deletion of a virtual machine.

The power measurement unit and the VM control unit, having been described above, may be program modules executed by the processing unit 410. Hereinafter, a function described as being processed by the power measurement unit or the VM control unit may be regarded as being processed by the processing unit 410. Also, data or information sent from other external devices to the power measurement unit or the VM control unit may be regarded as being received by the communication unit 420. Data or information sent from the power measurement unit or the VM control unit to other external devices may be regarded as being sent by the communication unit 420.

FIG. 5 shows an example in which virtual machines "VM (A)" and "VM (C1)" are running on the first VM server 130-1.

The user terminal 110 may request the generation of a virtual machine or a connection to a virtual machine.

The virtual machine "VM (C1)" may be a virtual machine activated on the first VM server 130-1, which was requested by the user terminal 110.

Figure 6:
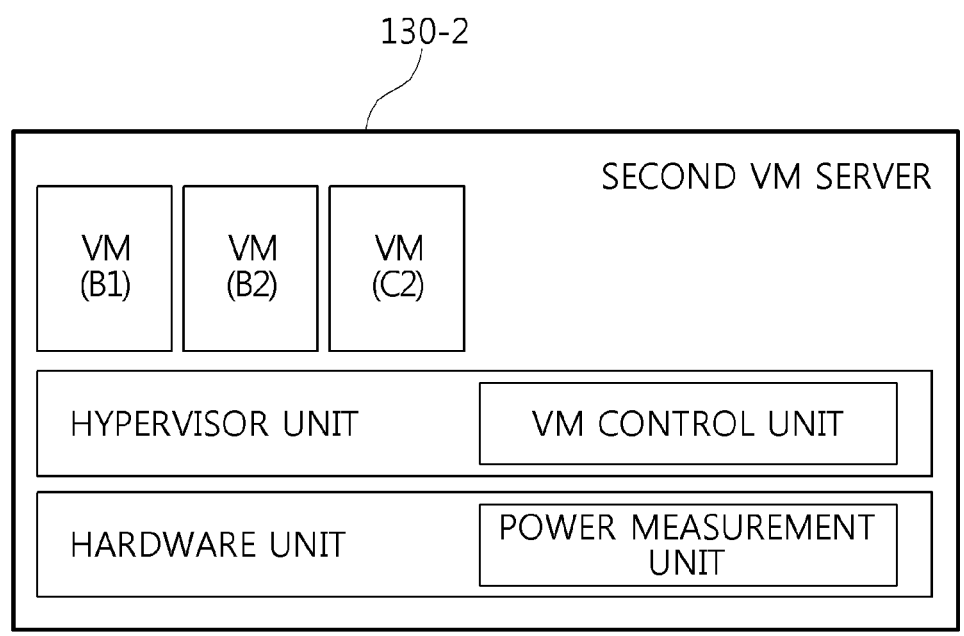
FIG. 6 shows the configuration of a second virtual machine server according to an example.

FIG. 6 shows the configuration of a second virtual machine server according to an example.

FIG. 6 shows an example in which virtual machines "VM (B1)", "VM (B2)", and "VM (C2)" are running on the second VM server 130-2.

The virtual machine "VM (C2)" may be a virtual machine activated on the second VM server 130-2, which was requested by the user terminal 110.

Referring to FIGS. 5 and 6, the virtual machine requested by the user terminal 110 may be activated as "VM (C1)" and "VM (C2)" respectively on the first VM server 130-1 and the second VM server 130-2. Here, the first VM server 130-1 may have a state in which a virtual machine "VM (A)" has been activated and in which "VM (A)" is already providing service. Also, the second VM server 130-2 may have a state in which virtual machines "VM (B1)" and "VM (B2)" have been activated and in which "VM (B1)" and "VM (B2)" are already providing service. That is, when the virtual machine requested by the user terminal 110 is activated, the multiple virtual machine servers may have different conditions or states. Here, the states of a virtual machine may include other virtual machines run by the virtual machine.

As illustrated in FIG. 5 and FIG. 6, when identical virtual machines (i.e., "VM (C1)" and "VM (C2)") are activated on multiple virtual machine servers, each of the virtual machine servers may actually measure efficiency of power usage before the virtual machine is added and efficiency of power usage after the virtual machine is added for a predefined time using the power measurement unit. Through the actual measurement, the change in efficiency of power usage may be calculated. Here, the change in efficiency of power usage may be calculated by subtracting the efficiency of power usage before the virtual machine is added from the efficiency of power usage after the virtual machine is added.

The virtual machine on the virtual machine server that has the lowest change in efficiency of power usage, among the multiple virtual machine servers, may be selected as the virtual machine that will provide service to the user terminal 110, and the selected virtual machine may be continuously maintained. Among the virtual machines on the multiple virtual machine servers, the remaining virtual machines, excluding the selected virtual machine, may be terminated. Through this process, the virtual machine having the lowest efficiency of power usage or a virtual machine that satisfies predefined conditions, among the virtual machines on the multiple virtual machine servers, may be activated and used.

For example, the predefined conditions may be a time, such as a few seconds or a few minutes. The efficiency of power usage by the virtual machines on the multiple virtual machine servers may be compared and evaluated based on the efficiency of power usage actually measured for the predefined time after the virtual machine is initialized and activated.

Figure 7:
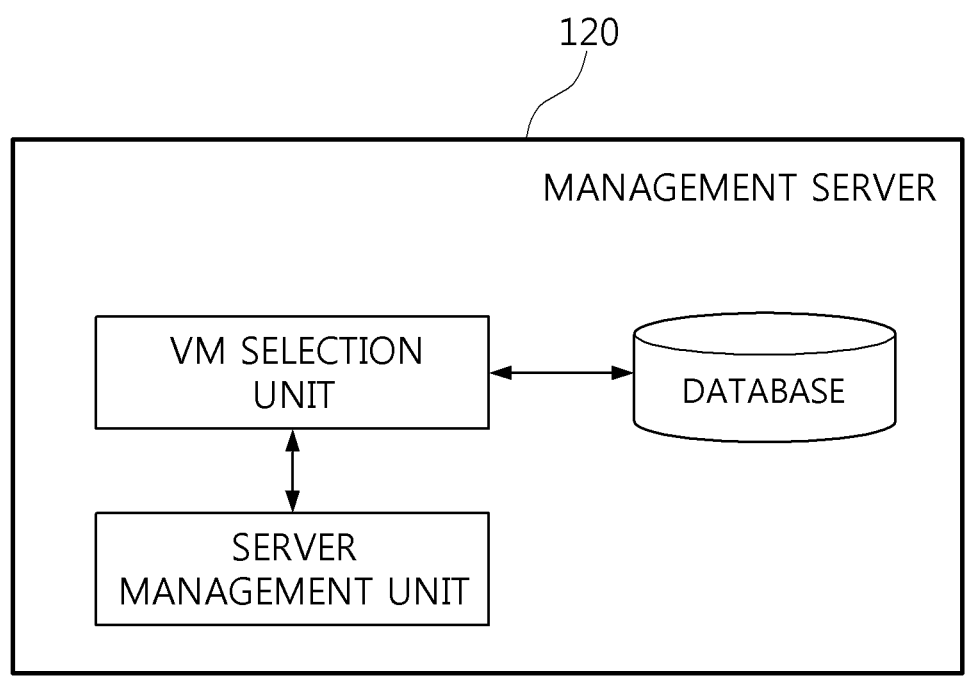
FIG. 7 shows the configuration of a management server according to an example.

FIG. 7 shows the configuration of a management server according to an example.

The management server 120 may include a server management unit, a VM selection unit and a database.

The server management unit may manage multiple virtual machine servers.

The VM selection unit may select a virtual machine to be provided to a user terminal 110.

The database may provide data to be used by the management server 120.

The server management unit, the VM selection unit, and the database may be program modules executed by the processing unit 310. Hereinafter, a function described as being processed by the server management unit, the VM selection unit or the database may be regarded as being processed by the processing unit 310. Also, data or information sent from other external devices to the server management unit, the VM selection unit and the database may be regarded as being received by the communication unit 320. Data or information sent from the server management unit, the VM selection unit and the database to other external devices may be regarded as being sent by the communication unit 320.

Figure 8:
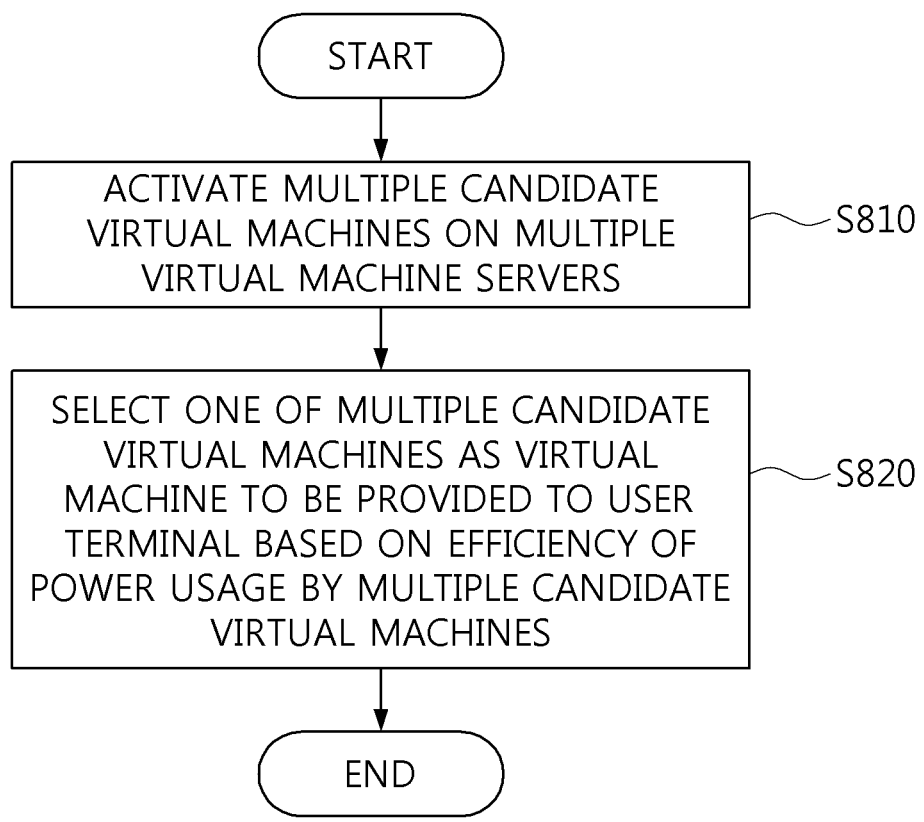
FIG. 8 is a flowchart of a method for providing a virtual machine according to an embodiment.

FIG. 8 is a flowchart of a method for providing a virtual machine according to an embodiment.

At step 810, in response to a request to provide a virtual machine from the user terminal 110, the server management unit of the management server 120 may activate multiple candidate virtual machines on multiple virtual machine servers by activating a candidate virtual machine on each of the multiple virtual machine servers.

At step 820, the VM selection unit of the management server 120 may select one of the multiple candidate virtual machines as the virtual machine to be provided to the user terminal 110 based on the efficiency of power usage by the multiple candidate virtual machines.

Steps 810 and 820 will be described below with reference to FIG. 9 and FIG. 11.

Figure 9:
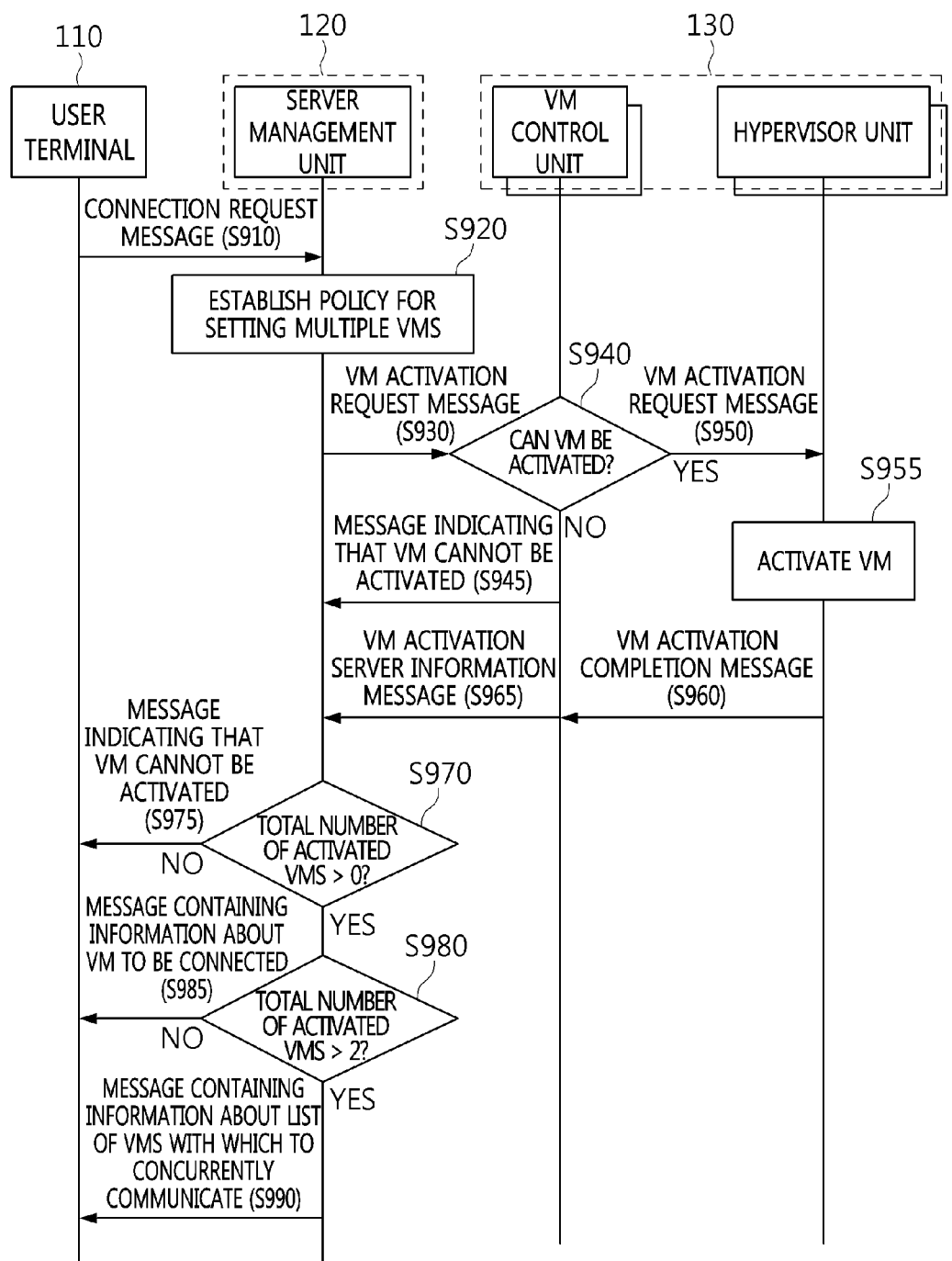
FIG. 9 is a flowchart of a method for generating candidate virtual machines according to an embodiment.

FIG. 9 is a flowchart of a method for generating candidate virtual machines according to an embodiment.

Step 810, having been described with reference to FIG. 8, may include at least some of the following steps 910, 920, 930, 940, 945, 950, 955, 960, 965, 970, 975, 980, 985 and 990.

The following steps 910, 920, 930, 940, 945, 950, 955, 960, 965, 970, 975, 980, 985 and 990 may be performed by the user terminal 110, the server management unit of the management server 120, the VM control unit of the virtual machine server 130, and the hypervisor unit of the virtual machine server 130. The virtual machine server 130 may comprise multiple virtual machine servers.

In FIG. 9, functions and operations illustrated as being performed by the VM control unit or the hypervisor unit may be performed by the VM control unit or the hypervisor unit of each of the multiple virtual machine servers. Also, functions and operations illustrated as being performed for the VM control unit or the hypervisor unit may be performed for the VM control unit or the hypervisor unit of each of the multiple virtual machine servers.

At step 910, the user terminal 110 may send a message for requesting a connection to the server management unit. The server management unit may receive the message for requesting a connection from the user terminal 110.

The message for requesting a connection may be a request to provide a virtual machine.

The message for requesting a connection may represent a virtual machine requested by the user terminal 110. For example, the message may include a description of the virtual machine requested by the user terminal 110.

At step 910, the user terminal 110 may be replaced by the administrator of the virtual machine provision system 100.

At step 920, the server management unit may establish a policy for setting multiple candidate virtual machines.

Here, the candidate virtual machine that is finally selected from among the multiple candidate virtual machines may become the virtual machine to be provided to the user terminal 110. That is, multiple candidate virtual machines may be candidates for the virtual machine to be provided to the user terminal 110.

Multiple virtual machine servers may be some of all the virtual machine servers, which are selected by the server management unit depending on predefined conditions.

According to a policy for setting multiple candidate virtual machines, the server management unit may select multiple virtual machine servers that are capable of activating the virtual machine requested by the user terminal 110 thereon, among all the virtual machine servers.

For example, the server management unit may search a database for metadata related to the virtual machine requested by the user terminal 110, and may select multiple virtual machine servers that are capable of activating the virtual machine requested by the user terminal 110, among all the virtual machine servers, using the metadata.

When a candidate virtual machine is activated on a virtual machine server, it is necessary to measure the power consumed by the candidate virtual machine. However, if another candidate virtual machine is also activated on the virtual machine server, it is uncertain how much power is consumed by each of the candidate virtual machines. Accordingly, a virtual machine server on which another candidate virtual machine has already been activated should be excluded from the multiple virtual machine servers on which a candidate virtual machine is to be activated.

For example, among all the virtual machine servers, a virtual machine server on which another candidate virtual machine, the efficiency of power usage of which is to be measured, has been already activated, may be excluded from the multiple virtual machine servers.

At step 930, the server management unit may send a message for requesting the activation of a virtual machine to the VM control unit of each of the multiple virtual machine servers. The VM control units may receive the message for requesting the activation of a virtual machine from the server management unit.

The message for requesting the activation of a virtual machine may be a request to activate a candidate virtual machine.

The message for requesting the activation of a virtual machine may include a description of a candidate virtual machine to be activated.

At step 940, the VM control unit may determine whether the candidate virtual machine can be activated on the virtual machine server 130.

The VM control unit may check whether the virtual machine server 130 satisfies conditions for activating the candidate virtual machine.

When it is determined that the candidate virtual machine cannot be activated because the conditions are not satisfied, step 945 may be performed. When it is determined that the candidate virtual machine can be activated because the conditions are satisfied, step 950 may be performed.

At step 945, the VM control unit may send a message indicating that the virtual machine cannot be activated to the server management unit of the management server 120. The server management unit of the management server 120 may receive the message indicating that the virtual machine cannot be activated from the VM control unit of the virtual machine server.

The message indicating that the virtual machine cannot be activated may be a notification saying that a candidate virtual machine is not activated on the corresponding virtual machine server 130.

At step 950, the VM control unit may send a message for requesting the activation of a virtual machine to the hypervisor unit.

At step 955, the hypervisor unit may activate a candidate virtual machine on the virtual machine server 130.

When multiple candidate virtual machines are activated on the multiple virtual machine servers, the multiple virtual machine servers may have different states.

When a candidate virtual machine is activated, the hypervisor unit may send a message indicating that the activation of a virtual machine is completed to the VM control unit at step 960.

At step 965, the VM control unit may send a message containing information about a virtual machine activation server to the server management unit of the management server 120. The server management unit of the management server 120 may receive the message containing information about a virtual machine activation server from the VM control unit of the virtual machine server.

The message containing information about a virtual machine activation server may be a notification saying that a candidate virtual machine is activated on the virtual machine server 130, or may include information about the candidate virtual machine or information about the virtual machine server 130 on which the candidate virtual machine is activated.

At steps 945 and 965, the management server 120 may receive a response to the message for requesting the activation of a virtual machine from each of the multiple virtual machine servers. The response may be information indicating whether a candidate virtual machine is activated on the corresponding virtual machine server.

Here, the information indicating whether a candidate virtual machine is activated may be the message indicating that the virtual machine cannot be activated or the message containing information about a virtual machine activation server, which have been described above. The management server 120 may integrate information indicating whether a candidate virtual machine is activated, received from the multiple virtual machine servers.

When step 945 or 965 is performed by the multiple virtual machine servers, the server management unit of the management server 120 may calculate the total number of activated candidate virtual machines. The total number of activated candidate virtual machines may be equal to the number of messages containing information about the virtual machine activation server, sent from the multiple virtual machine servers.

At step 970, the server management unit may check whether the number of activated candidate virtual machines is greater than 0.

When the number of activated candidate virtual machines is 0, step 975 may be performed.

When the number of activated candidate virtual machines is greater than 0, step 980 may be performed.

When the number of activated candidate virtual machines is 0, it may be determined at step 975 that no candidate virtual machine is generated on the virtual machine servers. When no candidate virtual machine is generated, the server management unit may send the user terminal 110 a message indicating that a virtual machine cannot be activated.

The message indicating that the virtual machine cannot be activated may be a notification saying that the virtual machine requested by the user terminal 110 is not provided.

After step 975 is performed, the process may be terminated.

At step 980, the server management unit may check whether the number of activated candidate virtual machines is greater than 2.

When the number of activated candidate virtual machines is not greater than 2, step 985 may be performed.

When the number of activated candidate virtual machines is greater than 2, step 990 may be performed.

At step 985, when the number of activated candidate virtual machines is 1, only a single candidate virtual machine may be provided to the user terminal 110. Accordingly, the activated candidate virtual machine may be selected as the virtual machine to be provided to the user terminal 110.

The server management unit may send the user terminal 110 a message containing information about the virtual machine with which to connect.

The message containing information about the virtual machine with which to connect may be information about the virtual machine to be provided to the user terminal 110. The virtual machine to be provided to the user terminal 110 may be the single activated candidate virtual machine.

For example, the information about the virtual machine may include the address of the virtual machine.

After step 985 is performed, the process may be terminated.

When the number of activated candidate virtual machines is greater than 2, multiple candidate virtual machines may be provided to the user terminal 110 at step 990, and one of the multiple candidate virtual machines may be selected as the virtual machine to be provided to the user terminal 110.

To this end, the multiple candidate virtual machines need to actually provide service to the user terminal 110 and to be simultaneously run by working in conjunction with the user terminal 110. Accordingly, it is necessary to connect the user terminal 110 with the multiple candidate virtual machines.

The server management unit may send the user terminal 110 a message containing information about a list of virtual machines to communicate with the user terminal 110. The user terminal 110 may receive the message containing information about the list from the server management unit of the management server 120.

The message containing information about the list of virtual machines to concurrently communicate may include information about targets of the multiple access communication. For example, the message containing information about the list of virtual machines to communicate may be information about the multiple candidate virtual machines activated on the multiple virtual machine servers.

For example, the information about the multiple candidate virtual machines may include the addresses of the multiple candidate virtual machines.

Figure 10:
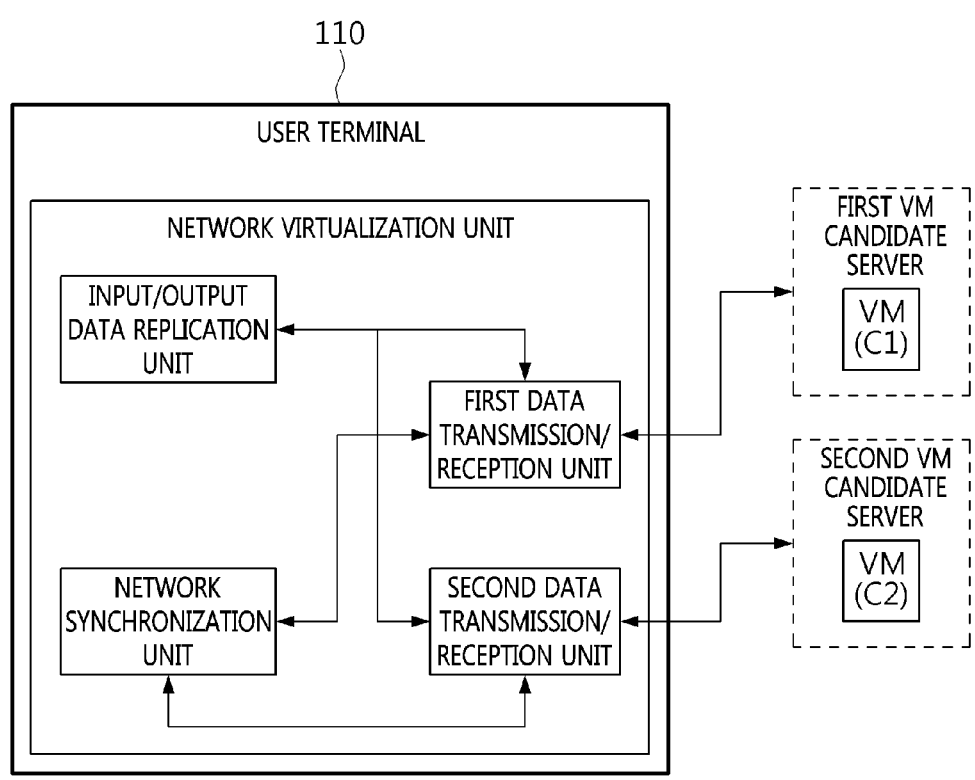
FIG. 10 shows the configuration of a user terminal for simultaneously running multiple candidate virtual machines.

As below, the configuration of a user terminal for simultaneously running multiple candidate virtual machines is illustrated in FIG. 10.

After step 990 is performed, step 820 may be performed.

FIG. 10 shows the configuration of a user terminal for simultaneously running multiple candidate virtual machines.

FIG. 10 illustrates the concept of virtualization of a network part for simultaneously running multiple candidate virtual machines through a single user terminal 110.

Through the virtualization of a network part, the user terminal 110 may be processed as if it were communicating with a single virtual machine server 130 from the point of view of the user or application of the user terminal 110.

The user terminal 110 may include a network virtualization unit. The network virtualization unit enables the user terminal 110 to simultaneously communicate with multiple candidate virtual machines. When multiple candidate virtual machines are activated, the user terminal 110 may simultaneously communicate therewith before a virtual machine is selected from among the multiple candidate virtual machines. Through the multi-communication, all of the multiple candidate virtual machines may be run, and the efficiency of power usage by each of the multiple candidate virtual machines may be actually measured.

The network virtualization unit may include an input/output data replication unit, a network synchronization unit and a plurality of data transmission/reception units.

In order to enable all of the multiple candidate virtual machines to be run, input data provided by the user terminal 110 must be provided to all of the multiple candidate virtual machines. Input data provided by the user terminal 110 may be provided to each of the multiple candidate virtual machines through replication and network virtualization.

The input/output data replication unit may generate replicated input data by replicating the input data generated in the user terminal 110. The input/output data replication unit may deliver the replicated input data to each of the multiple data transmission/reception units.

The multiple data transmission/reception units may communicate with multiple virtual machine servers or multiple candidate virtual machines, respectively. That is, each of the multiple data transmission/reception units may communicate with a corresponding one of the multiple virtual machine servers or a corresponding one of the multiple candidate virtual machines.

As illustrated in FIG. 10, among the multiple data transmission/reception units, a first data transmission/reception unit may communicate with a first virtual machine server. Among the multiple data transmission/reception units, a second data transmission/reception unit may communicate with a second virtual machine server.

The multiple virtual machine servers or the multiple candidate virtual machines may have different response speeds. Because the multiple virtual machine servers or the multiple candidate virtual machines have different response speeds when communicating, the network synchronization unit may synchronize the execution of the multiple candidate virtual machines. For example, the network synchronization unit may synchronize input data to be sent to the multiple virtual machine servers and/or output data sent from the multiple virtual machine servers.

Through the above-described virtualization, identical candidate virtual machines may be simultaneously run on the multiple virtual machine servers.

Figure 11:
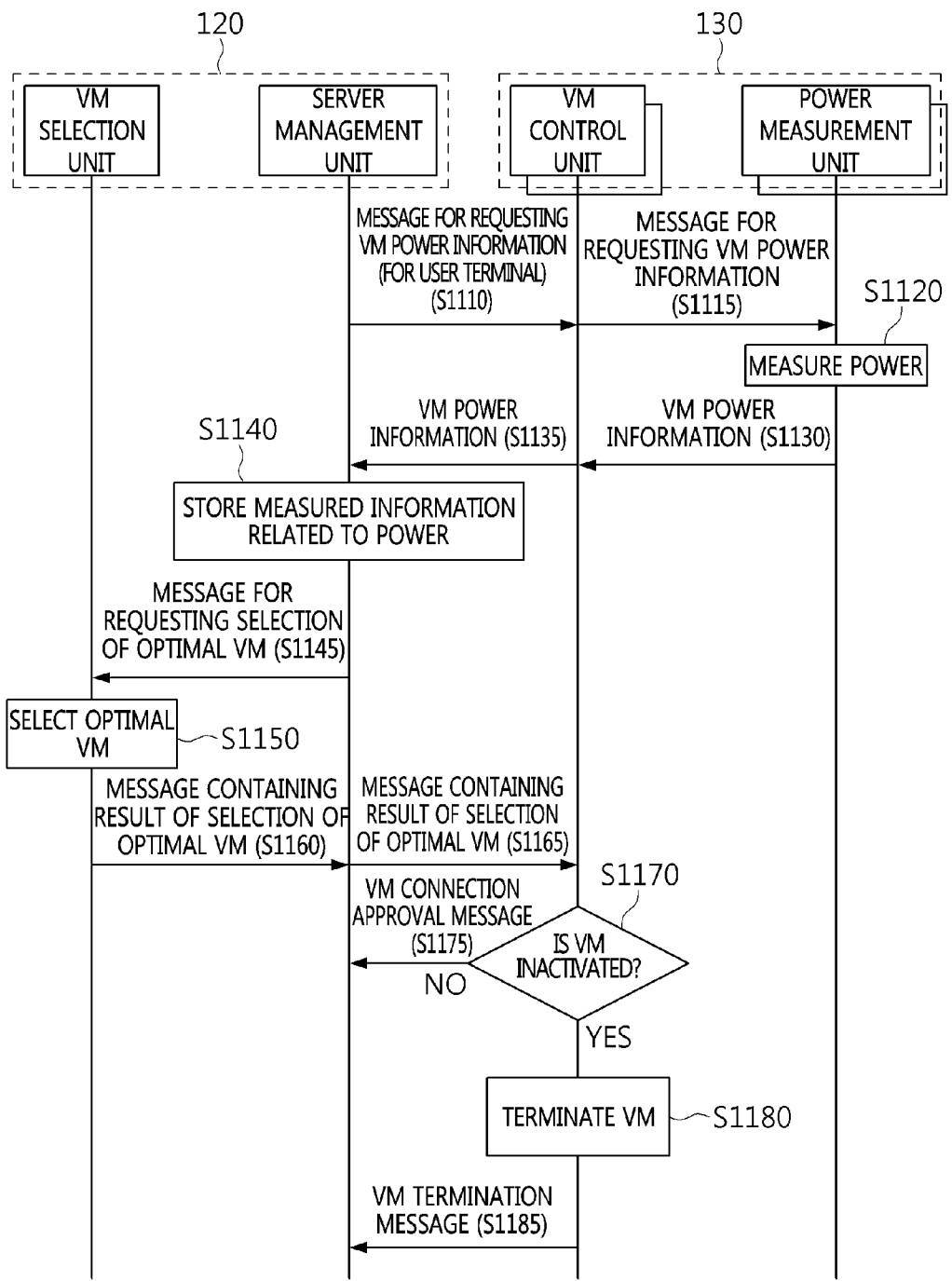
FIG. 11 is a flowchart of a method for selecting a virtual machine to be provided to a user terminal from among candidate virtual machines according to an embodiment.

FIG. 11 is a flowchart of a method for selecting a virtual machine to be provided to a user terminal from among candidate virtual machines according to an embodiment.

Step 820, having been described with reference to FIG. 8, may include at least some of the following steps 1110, 1115, 1120, 1130, 1135, 1140, 1145, 1150, 1160, 1165, 1170, 1175, 1180 and 1185.

The following steps 1110, 1115, 1120, 1130, 1135, 1140, 1145, 1150, 1160, 1165, 1170, 1175, 1180 and 1185 may be performed by the VM selection unit of the management server 120, the server management unit of the management server 120, the VM control unit of the virtual machine server 130, and the power measurement unit of the virtual machine server 130. The virtual machine server 130 may comprise multiple virtual machine servers.

In FIG. 11, functions and operations illustrated as being performed by the VM control unit or the power measurement unit may be performed by the VM control unit or the power measurement unit of each of the multiple virtual machine servers. Also, functions and operations illustrated as being performed for the VM control unit or the power measurement unit may be performed for the VM control unit or the power measurement unit of each of the multiple virtual machine servers.

At step 1110, the server management unit of the management server 120 may send a message for requesting power information of a virtual machine for the user terminal 110 to the VM control unit of each of the multiple virtual machine servers. The VM control units may receive the message for requesting power information of a virtual machine from the server management unit.

The message for requesting power information of a virtual machine may be a request for information about the efficiency of power usage by an activated candidate virtual machine.

In an embodiment, step 1115 may be performed after a predefined time has elapsed after multiple candidate virtual machines are activated. For example, step 1115 may be performed when the predefined time has elapsed after the above-described step 955, 965 or 990 is performed.

At step 1115, the VM control unit of the virtual machine server 130 may send the message for requesting power information of a virtual machine to the power measurement unit of the virtual machine server 130. The power measurement unit may receive the message for requesting power information of a virtual machine from the VM control unit.

At step 1120, the power measurement unit may measure power.

In an embodiment, the power measurement unit may measure the efficiency of power usage of a candidate virtual machine activated on the virtual machine server 130.

The efficiency of power usage of a candidate virtual machine may be the amount of power additionally consumed in the virtual machine server 130 when the candidate virtual machine is generated, activated, and run.

The efficiency of power usage of a candidate virtual machine may be calculated by comparing the efficiency of power usage actually measured before the candidate virtual machine is activated on the virtual machine server 130 with the efficiency of power usage actually measured after the candidate virtual machine is activated thereon. The efficiency of power usage of the candidate virtual machine may be a value calculated by subtracting the efficiency of power usage actually measured before the candidate virtual machine is activated from the efficiency of power usage actually measured after the candidate virtual machine is activated.

In an embodiment, the efficiency of power usage, actually measured after the candidate virtual machine is activated, may be measured when a predefined time has elapsed since the candidate virtual machine was activated. Here, the predefined time may be sufficient time to measure the change in efficiency of power usage caused by running the candidate virtual machine.

In an embodiment, the power measurement unit may actually measure the efficiency of power usage of the virtual machine server 130 before a candidate virtual machine is activated.

In an embodiment, after receiving the message for requesting power information of a virtual machine, the power measurement unit may actually measure the efficiency of power usage after the candidate virtual machine is activated.

In an embodiment, the power measurement unit may actually measure the efficiency of power usage of the virtual machine server 130 depending on a specific event, a specific condition or a predefined period. The power measurement unit divides the actually measured efficiency of power usage into the efficiency of power usage actually measured before the candidate virtual machine is activated and the efficiency of power usage actually measured after the candidate virtual machine is activated, and may thereby use the efficiency of power usage in order to calculate the efficiency of power usage of the candidate virtual machine.

The power measurement unit may measure information related to efficiency of power usage of a candidate virtual machine. The information related to efficiency of power usage of the candidate virtual machine may include information about the state of the virtual machine server 130 that is affected by running the candidate virtual machine.

The power measurement unit may generate virtual machine power information.

In an embodiment, the virtual machine power information may include information about the efficiency of power usage by a candidate virtual machine. Here, the efficiency of power usage by the candidate virtual machine may be calculated by the power measurement unit.

Alternatively, in an embodiment, the virtual machine power information may include information about the efficiency of power usage actually measured after a candidate virtual machine is activated and information about the efficiency of power usage actually measured before the candidate virtual machine is activated. Here, the efficiency of power usage by the candidate virtual machine may be calculated by the server management unit or VM selection unit of the management server 120.

The virtual machine power information may further include information related to efficiency of power usage by a candidate virtual machine.

The information related to efficiency of power usage by a candidate virtual machine may be one or more variables related to power, which will be described later.

At step 1130, the power measurement unit may send the virtual machine power information to the VM control unit.

At step 1135, the VM control unit may send the virtual machine power information to the server management unit of the management server 120. The server management unit may receive the virtual machine power information for the multiple candidate virtual machines from the multiple virtual machine servers.

At step 1140, the server management unit may store power measurement information in a database.

The power measurement information may include the virtual machine power information. Also, the power measurement information may include virtual machine power information for the multiple candidate virtual machines. For example, the power measurement information may include information about the efficiency of power usage by the multiple candidate virtual machines, and may include information related to efficiency of power usage by the multiple candidate virtual machines.

At step 1145, the server management unit may send a message for requesting the selection of an optimal virtual machine to the VM selection unit. The VM selection unit may receive the message for requesting the selection of the optimal virtual machine from the server management unit.

At step 1150, the VM selection unit may select the optimal candidate virtual machine from among the multiple candidate virtual machines. The optimal candidate virtual machine may be the candidate virtual machine having the highest energy efficiency.

The VM selection unit may use the power measurement information when selecting the optimal candidate virtual machine. The VM selection unit may acquire the power measurement information from the database. Alternatively, the message for requesting the selection of the optimal virtual machine may contain the power measurement information.

In an embodiment, the VM selection unit may select one of the multiple candidate virtual machines as the virtual machine to be provided to the user terminal 110 based on the efficiency of power usage by the multiple candidate virtual machines.

The method of selecting a virtual machine will be described later with reference to FIG. 12.

Among the multiple candidate virtual machines, the candidate virtual machine selected as the virtual machine to be provided to the user terminal 110 may maintain the activated state.

Among the multiple candidate virtual machines, the remaining candidate virtual machines, excluding the candidate virtual machine selected as the virtual machine to be provided to the user terminal 110, may be terminated.

At step 1160, the VM selection unit may send a message containing the result of selection of the optimal virtual machine to the server management unit. The server management unit may receive the message containing the result of selection of the optimal virtual machine from the VM selection unit.

The message containing the result of selection of the optimal virtual machine may represent the candidate virtual machine selected as the virtual machine to be provided to the user terminal 110, among the multiple candidate virtual machines.

The message containing the result of selection of the optimal virtual machine may include information in which the multiple candidate virtual machines are divided into the selected candidate virtual machine and an unselected candidate virtual machine. Alternatively, the message containing the result of selection of the optimal virtual machine may include information categorizing the multiple candidate virtual machines into a candidate virtual machine to be activated and a candidate virtual machine to be terminated.

At step 1165, the server management unit may send the message containing the result of selection of the optimal virtual machine to the VM control unit of each of the multiple virtual machine servers. The VM control units may receive the message containing the result of selection of the optimal virtual machine from the server management unit.

The message containing the result of selection of the optimal virtual machine may represent whether the candidate virtual machine of the virtual machine server 130 is selected as the virtual machine requested by the user terminal 110.

The message containing the result of selection of the optimal virtual machine to be sent may be a final activation request message or a stop request message. Using the message containing the result of selection of the optimal virtual machine, the server management unit may select either the final activation request message or the stop request message as the message to be sent to each of the multiple virtual machine servers.

The final activation request message may be a message to be sent to the virtual machine server 130 corresponding to the selected candidate virtual machine. The final activation request message may be a message for requesting to activate the candidate virtual machine or a message for requesting to continuously keep the candidate virtual machine running.

The stop request message may be a message to be sent to the virtual machine server 130 corresponding to the unselected candidate virtual machine. The stop request message may be a message for requesting inactivation of the candidate virtual machine or a message for requesting termination of the candidate virtual machine.

At step 1170, the VM control unit may determine whether to inactivate the candidate virtual machine running on the virtual machine server 130.

When the message containing the result of selection of the optimal virtual machine indicates that the candidate virtual machine running on the virtual machine server 130 is selected as the virtual machine requested by the user terminal 110, the candidate virtual machine may not be inactivated.

When the message containing the result of selection of the optimal virtual machine indicates that the candidate virtual machine running on the virtual machine server 130 is not selected as the virtual machine requested by the user terminal 110, the candidate virtual machine may be inactivated.

When the message containing the result of selection of the optimal virtual machine, sent to the VM control unit, is the final activation request message, the candidate virtual machine may not be inactivated.

When the message containing the result of selection of the optimal virtual machine, sent to the VM control unit, is the stop request message, the candidate virtual machine may be inactivated.

When the candidate virtual machine is not inactivated, step 1175 may be performed.

When the candidate virtual machine is inactivated, step 1180 may be performed.

At step 1175, the VM control unit may send a virtual machine connection approval message to the server management unit of the management server 120. The server management unit may receive the virtual machine connection approval message from the VM control unit of the virtual machine server 130.

Through the virtual machine connection approval message, the server management unit may finally confirm that the virtual machine server 130 provides the virtual machine to the user terminal 110.

Also, the VM control unit may send the virtual machine connection approval message to the user terminal 110. The user terminal 110 may receive the virtual machine connection approval message from the VM control unit of the virtual machine server 130. Through the virtual machine connection approval message, the user terminal 110 may confirm that the virtual machine server 130 provides the virtual machine to the user terminal 110.

At step 1180, the VM control unit may terminate the candidate virtual machine.

At step 1185, the VM control unit may send a virtual machine termination message to the server management unit of the management server 120. The server management unit may receive the virtual machine termination message from the VM control unit of the virtual machine server 130.

Through the virtual machine termination message, the server management unit may confirm that the candidate virtual machine of the virtual machine server 130 is terminated.

Also, the VM control unit may send the virtual machine termination message to the user terminal 110. The user terminal 110 may receive the virtual machine termination message from the VM control unit of the virtual machine server 130. Through the virtual machine termination message, the user terminal 110 may confirm that the candidate virtual machine of the virtual machine server 130 is terminated, and may thus terminate the connection with the virtual machine server 130 or the candidate virtual machine.

Through steps 1175 and 1185, the server management unit may receive a response to the message containing the result of selection of the optimal virtual machine from the multiple virtual machine servers.

Figure 12:
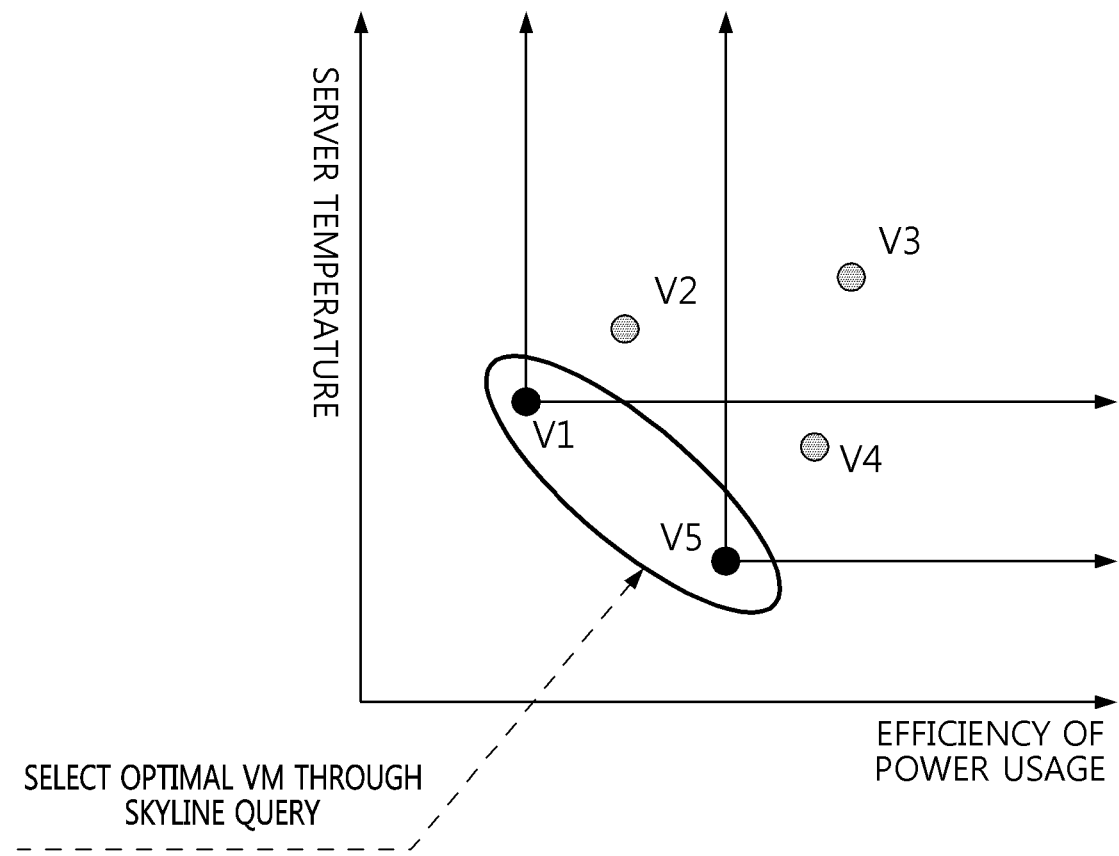
FIG. 12 is a concept diagram for explaining a method for selecting the optimal candidate virtual machine according to an example.

FIG. 12 is a concept diagram for explaining a method for selecting an optimal candidate virtual machine according to an example.

FIG. 12 conceptually illustrates criteria for and the process of selecting the optimal candidate virtual machine from among multiple candidate virtual machines.

As described above, one of the criteria for selecting the optimal candidate virtual machine may be the efficiency of power usage by a candidate virtual machine. When a candidate virtual machine is additionally activated on a virtual machine server 130, the state of the virtual machine server 130 may be changed. Here, it may be more desirable to select a candidate virtual machine based on the total power to be consumed until the candidate is to be terminated, rather than based on only measured efficiency of power usage.

For example, at step 1150, which was described with reference to FIG. 11, the VM selection unit may select one of multiple candidate virtual machines as the virtual machine to be provided to the user terminal 110 based on one or more variables related to power. The term "variable" may be used as having the same meaning as the term "attribute".

The one or more variables related to power may be variables that affect the total power to be consumed until a candidate virtual machine is terminated. For example, the one or more variables related to power may include at least one of the efficiency of power usage by each of the multiple candidate virtual machines, the temperature of the virtual machine server on which each candidate virtual machine is run, the difference between the maximum value and the minimum value of the efficiency of power usage, the CPU utilization by the candidate virtual machine, the memory utilization by the candidate virtual machine, the I/O resource utilization by the candidate virtual machine, and the average network transfer rate of the candidate virtual machine.

The virtual machine power information, having been described with reference to FIG. 11, may include one or more variables related to power for a virtual machine server 130 or a candidate virtual machine.

The total amount of power to be consumed until a candidate virtual machine is terminated may be most affected by the actually measured efficiency of power usage, among the one or more variables related to power. In an embodiment, a virtual machine to be provided to a user terminal may be selected through two steps.

First, in consideration of the fact that the efficiency of power usage most strongly affects the amount of power to be consumed until a candidate virtual machine is terminated, the VM selection unit may first select a predefined number or a predefined percentage of virtual machines having the least efficiency of power usage, among multiple candidate virtual machines. For example, the predefined percentage may be 10%. The predefined number or predefined percentage of virtual machines, which are first selected, may constitute a set of limited candidates.

Next, the VM selection unit may select one of the first selected virtual machines as a virtual machine to be provided to the user terminal 110 based on the one or more variables related to power.

In an embodiment, using a weighted sum of the one or more variables related to power, the VM selection unit may select one of the multiple candidate virtual machines as the virtual machine to be provided to the user terminal 110. For example, for each of the one or more variables related to power, a weight based on the importance of each variable may be applied thereto. The VM selection unit may prioritize the candidate virtual machines using the weighted sum of the one or more variables related to power.

The method of using the weighted sum may not be suitable for application to an environment in which various services are provided, such as the virtual machine provision system 100. In an embodiment, the VM selection unit may select one of the multiple candidate virtual machines as the virtual machine to be provided to the user terminal 110, using a skyline query for at least some of the one or more variables related to power.

Through the skyline query, a superior candidate can be selected from among objects having multiple attributes, without applying a weight thereto.

The skyline query may be retrieval of a set of data that are not dominated by other data for all attributes, among data having multiple attributes. Data that are not dominated by any other data for all attributes may be regarded as data preferred by a user.

Between data having multiple attributes, when first data dominate second data, this may indicate that values of all the attributes of the first data are equal to or less than values of all the attributes of the second data and that a value of at least one attribute of the first data is less than a value of at least one attribute of the second data.

In the graph in FIG. 12, the temperature of a virtual machine server and the efficiency of power usage by a candidate virtual machine are illustrated as the attributes of data. Also, in the graph in FIG. 12, five activated candidate virtual machines, namely V1, V2, V3, V4 and V5, are illustrated. The values of the attributes of V1 are less than those of V2 and V3. Accordingly, V1 may dominate V2 and V3. Also, the values of the attributes of V5 are less than those of V3 and V4. Accordingly, V5 may dominate V3 and V4. The candidate virtual machines that are not dominated by any other candidate virtual machine, V1 and V5, may be selected as the result of the skyline query.

When two or more candidate virtual machines are selected as the result of the skyline query, a variable other than the variables used in the skyline query may be used to select the final one. For example, in the precedence of CPU utilization, memory utilization, and I/O resource utilization, the candidate virtual machine having the lowest utilization may be selected. When two or more candidate virtual machines are found as the result of the skyline query, the VM selection unit may select one of the candidate virtual machines found through the skyline query as the virtual machine to be provided to the user terminal 110, using the remaining variables, excluding at least some of the variables used for the skyline query, among the one or more variables related to power.

The device described herein may be implemented using hardware components, software components, or a combination thereof. For example, the device and components described in the embodiments may be implemented using one or more general-purpose or special-purpose computers, for example, a processor, a controller, an arithmetic logic unit (ALU), a digital signal processor, a microcomputer, a field programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of machine, component, physical or virtual equipment, computer storage medium, or device, or in a propagated signal wave in order to provide instructions or data to the processing devices or to be interpreted by the processing devices. The software may also be distributed in computer systems over a network such that the software is stored and executed in a distributed manner. In particular, the software and data may be stored in one or more computer-readable recording media.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk CD-ROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

There are provided an apparatus and method for selecting a virtual machine that is most suitable from the aspect of energy efficiency by actually measuring efficiency of power usage by virtual machines.

There are provided an apparatus and method in which, through data replication and virtualization, identical candidate virtual machines are simultaneously run on multiple virtual machine servers, which enables the actual measurement of efficiency of power usage by the candidate virtual machines on the virtual machine servers.

There are provided an apparatus and method in which multiple virtual machine servers may selectively provide a virtual machine depending on the efficiency of power usage by the virtual machine.

There are provided an apparatus and method for providing the most suitable virtual machine by actually measuring the efficiency of power usage by a virtual machine according to various dynamic energy-saving policies in response to a service request made by a user.

There are provided an apparatus and method that enable energy savings by selecting and providing the virtual machine that is most suitable from the aspect of energy efficiency.

There are provided an apparatus and method for providing the most suitable virtual machine through efficiency of power usage and performance comparisons.

Although the embodiments of the present invention have been disclosed for illustrative purposes, those skilled in the art will appreciate that various modifications, additions and substitutions are possible, without departing from the scope and spirit of the invention. For example, if the described techniques are performed in a different order, if the described components, such as systems, architectures, devices, and circuits, are combined or coupled with other components by a method different from the described methods, or if the described components are replaced with other components or equivalents, the results are still to be understood as falling within the scope of the present invention.

What is claimed is:

1. A method for providing a virtual machine, comprising:
   receiving a request to provide a virtual machine; and
   in response to receiving the request:
   selecting a plurality of virtual machine servers,
   requesting activation of a candidate virtual machine on each of the selected virtual machine servers,
   receiving power measurement information for each of the activated candidate virtual machines, and
   selecting, using the power measurement information of the activated candidate virtual machines, one of the activated candidate virtual machines as the virtual machine to be provided based on energy efficiency of power usage by the activated candidate virtual machines,
   wherein the energy efficiency of power usage by an activated candidate virtual machine is calculated by comparing an energy efficiency of power usage measured before the activated candidate virtual machine is activated on the selected virtual machine server of the activated candidate virtual machine with an energy efficiency of power usage measured after the activated candidate virtual machine is activated on the virtual machine server of the activated candidate virtual machine.

2. The method of claim 1, wherein selecting the plurality of virtual machine servers includes selecting the plurality of virtual machine servers from among all virtual machine servers according to predefined conditions.

3. The method of claim 2, wherein selecting the plurality of virtual machine servers includes excluding from selection a virtual machine server on which a candidate virtual machine has already been activated for power usage measurement.

4. The method of claim 1, wherein, when the respective candidate virtual machines are activated on the selected plurality of virtual machine servers, the selected plurality of virtual machine servers have respective different states.

5. The method of claim 1, wherein the request is received from a user terminal, and further comprising:
providing a list of the virtual machine servers of the activated candidate virtual machines to the user terminal,
wherein the user terminal uses the list to simultaneously communicate with the activated candidate virtual machines before the virtual machine to be provided is selected from among the activated candidate virtual machines.

6. The method of claim 5, wherein the user terminal simultaneously communicating with the activated candidate virtual machines includes the user terminal providing replicated input data to each of the activated candidate virtual machines through replication and network virtualization.

7. The method of claim 1, wherein the efficiency of power usage measured after the activated candidate virtual machine is activated is measured when a predefined time is elapsed after the activated candidate virtual machine is activated.

8. The method of claim 1, wherein:
the virtual machine to be provided to the user terminal is selected based on one or more variables related to power; and
the one or more variables related to power includes at least one of the efficiency of power usage by each of the activated candidate virtual machines, a temperature of each selected virtual machine server on which an activated candidate virtual machines is run, a difference between a maximum value and a minimum value of the efficiency of power usage, a Central Processing Unit (CPU) utilization by each of the activated candidate virtual machines, a memory utilization by each of the activated candidate virtual machines, an I/O resources utilization by each of the activated candidate virtual machines, and an average network transfer rate of each of the activated candidate virtual machines.

9. The method of claim 8, wherein the virtual machine to be provided is selected from among the activated candidate virtual machines using a skyline query for at least some of the one or more variables related to power.

10. The method of claim 9, wherein, when two or more activated candidate virtual machines are found as a result of the skyline query, one of the found activated candidate virtual machines is selected as the virtual machine to be provided, using remaining variables, excluding the at least some of the one or more variables related to power.

11. A management server comprising:
a processor,
wherein the management server is configured to:
receive a request to provide a virtual machine; and
in response to receiving the request:
select a plurality of virtual machine servers,
request activation of candidate virtual machine on each of the selected virtual machine servers,
receive power measurement information for each of the activated candidate virtual machines, and
select, using the power measurement information of the activated candidate virtual machines, one of the activated candidate virtual machines as the virtual machine to be provided based on energy efficiency of power usage by the activated candidate virtual machines,
wherein the energy efficiency of power usage by an activated candidate virtual machine is calculated by comparing an energy efficiency of power usage measured before the activated candidate virtual machine is activated on the selected virtual machine server of the activated candidate virtual machine with an energy efficiency of power usage measured after the activated candidate virtual machine is activated on the virtual machine server of the activated candidate virtual machine.

12. The management server of claim 11, wherein the management server is further configured to select the plurality of virtual machine servers by excluding from the selected virtual machine servers any virtual machine servers on which another candidate virtual machine is activated.

13. The management server of claim 11, wherein the request is received from a user terminal, and wherein the management server is further configured to cause the user terminal to simultaneously communicate with each of the activated candidate virtual machines before the selection of the virtual machine to be provided.

14. The management server of claim 11, wherein the power measurement information for each of the activated candidate virtual machines includes information corresponding to a comparison of the efficiency of power usage measured before the activation of the candidate virtual machine on the corresponding selected virtual machine server with the efficiency of power usage measured a predefined time after the activation of the candidate virtual machine on the corresponding selected virtual machine server.

15. The management server of claim 11,
wherein the virtual machine to be provided is selected based on the energy efficiency of power usage and at least one or more variables related to power, and
wherein the one or more variables related to power includes at least one of a temperature of a selected virtual machine server on an activated candidate virtual machines is run, a difference between a maximum value and a minimum value of the efficiency of power usage, a Central Processing Unit (CPU) utilization by the activated candidate virtual machine, a memory utilization by the activated candidate virtual machine, an I/O resources utilization by the activated candidate virtual machine, and an average network transfer rate of the activated candidate virtual machine.

16. A non-transitory computer-readable media including computer programing instructions which, when executed by a processor of a management server, cause the management server to perform acts comprising:
receiving a request to provide a virtual machine; and
in response to receiving the request:
selecting a plurality of virtual machine servers, requesting activation of a candidate virtual machine on each of the selected virtual machine servers, receiving power measurement information for each of the activated candidate virtual machines, and selecting, using the power measurement information of the activated candidate virtual machines, one of the activated candidate virtual machines as the virtual machine to be provided based on energy efficiency of power usage by the activated candidate virtual machines, wherein the energy efficiency of power usage by an activated candidate virtual machine is calculated by comparing an energy efficiency of power usage measured before the activated candidate virtual machine is activated on the selected virtual machine server of the activated candidate virtual machine with an energy efficiency of power usage measured after the activated candidate virtual machine is activated on the virtual machine server of the activated candidate virtual machine.

17. The non-transitory computer-readable media of claim 16, the acts further comprising selecting the plurality of virtual machine servers by excluding from selection any virtual machine server on which another candidate virtual machine is activated.

18. The non-transitory computer-readable media of claim 16, wherein the request is received from a user terminal, and the acts further comprising causing the user terminal to simultaneously communicate with each of the activated candidate virtual machines before the selection of the virtual machine to be provided.

19. The non-transitory computer-readable media of claim 16, the acts further comprising receiving information on energy efficiency of power usage from each virtual machine server of the selected virtual machine servers, the information on energy efficiency of power usage corresponding to a comparison of efficiency of power usage measured before an activation of a candidate virtual machine on the virtual machine server with efficiency of power usage measured a predefined time after the activation of the candidate virtual machine on the virtual machine server.

20. A method for providing a virtual machine, comprising:
receiving a request to provide a virtual machine to execute a job requested by a user; and in response to receiving the request:
selecting a plurality of virtual machine servers,
requesting activation of a candidate virtual machine on each of the selected virtual machine servers,
requesting execution of the job to all the activated candidate virtual machines simultaneously and providing input data input by the user to all the activated candidate virtual machines simultaneously,
receiving power measurement information for each of the activated candidate virtual machines, and
selecting, using the power measurement information of the activated candidate virtual machines, one of the activated candidate virtual machines as the virtual machine to be provided based on energy efficiency of power usage by the activated candidate virtual machines, wherein the selecting the virtual machine to be provided comprises:
continuing the execution of the job on the virtual machine to be provided, and
requesting deactivation of remaining activated candidate virtual machines.

* * * * *